United States Patent
Calero Casanova et al.

(10) Patent No.: US 11,679,568 B2
(45) Date of Patent: Jun. 20, 2023

(54) SANDWICH PANEL WITH A HONEYCOMB CORE AND METHOD FOR MANUFACTURING THEREOF

(71) Applicants: AIRBUS OPERATIONS SL, Madrid (ES); Alestis Aerospace S.L., Madrid (ES)

(72) Inventors: Alvaro Calero Casanova, Madrid (ES); Jesus Javier Vazquez Castro, Madrid (ES); Diego Garcia Martin, Madrid (ES); Asuncion Butragueno-Martinez, Madrid (ES); Maria del Carmen Aguilar Barroso, Madrid (ES); Jose Martin Bravo, Madrid (ES); Ana Frutos Muñoz, Madrid (ES)

(73) Assignees: Airbus Operations SL, Madrid (ES); Alestis Aerospace S.L., Madrid (ES)

( * ) Notice: Subject to any disclaimer, the term of this patent is extended or adjusted under 35 U.S.C. 154(b) by 78 days.

(21) Appl. No.: 17/394,074

(22) Filed: Aug. 4, 2021

(65) Prior Publication Data
US 2022/0040936 A1    Feb. 10, 2022

(30) Foreign Application Priority Data
Aug. 5, 2020   (EP) .................................. 20382727

(51) Int. Cl.
*B29C 70/36*    (2006.01)
*B32B 3/12*    (2006.01)
(Continued)

(52) U.S. Cl.
CPC .............. *B29C 70/36* (2013.01); *B29C 65/48* (2013.01); *B29C 66/7254* (2013.01);
(Continued)

(58) Field of Classification Search
CPC ......... B29C 70/36; B29C 70/443; B32B 3/12; B32B 7/12; B32B 27/12; B32B 37/12
See application file for complete search history.

(56) References Cited

U.S. PATENT DOCUMENTS 4,942,013 A * 7/1990 Palmer ................ B29C 43/3642
264/511
2009/0252921 A1 10/2009 Bottler et al.
(Continued)

FOREIGN PATENT DOCUMENTS

AU   2007219544 B2 * 4/2011 ........... B29C 70/443
EP      1795332 A1 * 6/2007 ........... B29C 70/086
(Continued)

OTHER PUBLICATIONS

Machine translation of JP 3676678 B2 dated May 2005. (Year: 2005).*
(Continued)

*Primary Examiner* — Robert B Davis
(74) *Attorney, Agent, or Firm* — Nixon & Vanderhye P.C.

(57) ABSTRACT

A method for manufacturing an aeronautical sandwich panel with a honeycomb core and results in a core sealed to prevent infused resin from entering into the honeycomb core open cells while improving its mechanical properties, especially for curved or highly curved panels. In further embodiments, the invention proposes the automation of this process.

13 Claims, 2 Drawing Sheets

(51) Int. Cl.
*B32B 7/12* (2006.01)
*B32B 27/12* (2006.01)
*B32B 37/12* (2006.01)
*B29C 70/54* (2006.01)
*B29C 70/44* (2006.01)
*B29C 65/00* (2006.01)
*B29C 65/48* (2006.01)
*B29K 101/12* (2006.01)
*B29L 9/00* (2006.01)

(52) U.S. Cl.
CPC ............ *B29C 70/44* (2013.01); *B29C 70/541* (2013.01); *B29C 70/545* (2013.01); *B32B 3/12* (2013.01); *B32B 7/12* (2013.01); *B32B 27/12* (2013.01); *B32B 37/12* (2013.01); *B29K 2101/12* (2013.01); *B29L 2009/00* (2013.01)

(56) References Cited

U.S. PATENT DOCUMENTS

2013/0236688 A1   9/2013   Stamp et al.
2017/0066201 A1   3/2017   Bieder et al.

FOREIGN PATENT DOCUMENTS

| | | | |
|---|---|---|---|
| EP | 1 897 680 | 3/2008 | |
| JP | 3676678 B2 * | 7/2005 | ........... B29C 70/386 |
| WO | 2017/009423 | 1/2017 | |

OTHER PUBLICATIONS

Extended European Search Report for EP Application No. 20382727.4 dated Jan. 14, 2021, 10 pages.

* cited by examiner

SANDWICH PANEL WITH A HONEYCOMB CORE AND METHOD FOR MANUFACTURING THEREOF

RELATED APPLICATION

This application claims priority to European patent application 20382727-4, filed Aug. 5, 2020, the entirety of which is incorporated by reference.

TECHNICAL FIELD

The present invention belongs to the field of composites manufacturing, and particularly, to a method for manufacturing an aeronautical sandwich panel with a honeycomb core.

BACKGROUND

Sandwich panels are composite materials typically used in aeronautics to form light-weight components of an aircraft. In general, sandwich panels include a honeycomb core sandwiched between composite layers covering opposite sides of the core.

Sandwich panels with honeycomb cores are referred to as a "honeycomb sandwich panel." These panels typically have a high strength-to-weight ratio. In aeronautics, honeycomb sandwich panels are often used to form aerodynamic fairings, such as a belly fairing; trailing edges and leading edges of aerodynamic structures such as wings and aerodynamic control surfaces of an empennage; access doors or covers such as doors covering landing gears, and internal panels of the aircraft.

The material used to form a honeycomb sandwich panel depends on the temperatures that the panel is expected to experience when on the aircraft, requirements of the panel to resist corrosion, including suppressing galvanic corrosion with adjacent parts, and strength requirements for the installation location on the aircraft where the panel is to be located.

The composite layers that cover a honeycomb core are typically formed of a fiber reinforced polymer that includes fibers and a resin binding the fibers in a matrix, and to the honeycomb core. The manufacturing techniques for the layers that cover the honeycomb core depend on whether the composite layers and resin are supplied as a "pre-preg" product to be laid on the honeycomb core, or whether the resin is first applied after the composite layers are applied to cover the honeycomb core. If the layer is supplied as a pre-preg, the layer may include plies of composite reinforcement material already impregnated with a resin. If not supplied as a pre-preg produce, the layers are formed by dry fiber plies (a so-called fiber preform) to which resin is to be infused or injected into the plies. A resin is applied to the dry fiber plies after they are laid onto the honeycomb core.

After the honeycomb core is sandwiched between the layers of composite material, the sandwiched assembly of the honeycomb core and layers in subjected to a curing cycle where temperature, pressure and/or vacuum is applied over a predetermined time.

For many years, the layers were typically a pre-preg CFRP (carbon fibre reinforced polymer) layer or pre-preg GFRP (glass fibre reinforced polymer) layer. These materials were used improve mutual adhesion between the layers and the honeycomb core. The honeycomb sandwich panels were traditionally manufactured with these pre-preg CFRP and GFRP materials, such as the composite layers, because these pre-preg materials avoided or suppressed resin flow into the open cells of the honeycomb.

Also, an adhesive tape or adhesive plies were applied at the interface between the plies of the layers and the honeycomb core. The adhesive tape or sheet improved adhesion between the layers. The adhesive tape or sheet was used because the resin present in the pre-preg CFRP and pre-preg GFRP plies was deemed insufficient to produce a good meniscus at the interface between the plies of the layer and the honeycomb core.

The adhesive tapes or plies at the interface between the composite layers and the honeycomb core allow little air permeability and thus do not allow proper vacuuming inside the cells of the honeycomb core. Because of the inability to achieve proper vacuuming in the cells of the honeycomb core, the resulting honeycomb core sandwich panel is subject to manufacturing difficulties that may penalize their mechanical properties. These difficulties and penalties have limited the use of honeycomb core sandwich panels to exceptional cases.

Approaches to reducing the difficulties in achieving proper vacuuming in an open celled sandwich core has been to form the layers of dry fiber materials and used a honeycomb core having closed cells. Closed cells reduce the risk of not being able to achieve proper vacuuming and reduce resin filling the cells during manufacture of the honeycomb sandwich panel.

When both constituents of the composite covers are originally separated, the basic steps to form a honeycomb sandwich panel are: placing dry fabric or fiber preform into a cavity of a mold surrounding the honeycomb core; closing the mold either by a vacuum bag on the other half of the mold; and injecting a thermoset resin, such as typically epoxy resin, into the mold (if the mold is closed with the other half of the mold or infusing the resign if a vacuum bag) through a set of injection ports under relatively low pressure. Once the resin impregnates the whole fiber preform, the ensemble is cured as a finished component to be demolded.

European Patent Application EP1897680A1, incorporated herein by reference, describes a solution for avoiding the resin to enter into the open cells of the honeycomb when manufacturing sandwich panels by resin infusion techniques. Above the honeycomb is placed, from the inside to the outside, a curable adhesive layer and an impervious barrier layer (pervious to gas to let deaerate but impervious to resin) to form and seal the honeycomb core. Then, dry fibers are placed on top and the infusion process is performed under vacuum. This known solution works properly for simple and flat or substantially flat panels but there is still a need for manufacturing curved or highly curved panels as the ones typically used in aeronautics since dry fiber preforms normally skid during the infusion process.

The existing manufacturing processes either with pre-preg or infusion/injection process as described above is a manual processes. Thus, all the materials used for the part as well as any other ancillary plies, for instance, in regard of the resin infusion/injection or for the curing process, are placed and adapted to the different geometries by hand.

There is a need in the industry for an easy, quick, reliable, and effective fabrication of sandwich panels that can be applied extensively regardless of the intended geometry while assuring the imparted mechanical properties so as to meet structural requirements.

SUMMARY

The present invention provides a solution for the aforementioned problems, by a method for manufacturing a honeycomb sandwich panel and a manufacturing tool. The manufacturing method may be applied to provide an optimized core sealing solution for preventing infused resin from entering into the honeycomb core open cells while improving the mechanical properties of the resulting honeycomb sandwich panel. This method is applicable to flat panels, to curved panels and highly curved panels. The manufacturing process may also be embodied as an automated process for manufacturing honeycomb sandwich panels by resin infusion.

The invention may be embodied as a method for manufacturing a honeycomb sandwich panel. The method may include the steps of: (i) laying-up an ensemble formed by a honeycomb core having honeycomb cells and, at least on one side on said honeycomb core, from the inside to the outside: a curable adhesive layer and an amorphous thermoplastic film; (ii) laying-up dry fiber over the ensemble; (iii) arranging said dry fiber and ensemble on a one-sided mold and confining it in a gas-tight space by arranging a vacuum sheet over said one-sided mold; (iv) producing a vacuum in said gas-tight space before complete or partial curing of said adhesive layer, so that said honeycomb cells are at least partly evacuated before they are sealed by the curable adhesive layer and an amorphous thermoplastic film; (v) infusing said fiber layer under vacuum with a resin; and (vi) curing said resin under vacuum and temperature cycle.

The amorphous thermoplastic film is bonded to the honeycomb core due to the adhesive layer, and to the dry fiber plies due to the resin.

The thermoplastic film may have an amorphous structure, which has a randomly ordered polymeric structure with zero (0%) crystallinity. Similarly, the thermoplastic film may have a minimal semi-crystalline structure in which the crystalline degree is below 5% at atmospheric conditions. Thus, the thermoplastic film according to the invention may be an amorphous or minimal semi-crystalline (i.e. with a crystalline degree below 5%) thermoplastic film.

Amorphous and minimal semi-crystalline thermoplastic films soften gradually as the temperature increases and do not have sharp melting points. In contrast, semi-crystalline polymers with degrees of crystallinity higher than 5% typically have sharp melting points. In addition, the amorphous and minimal semi-crystalline (less than 5% crystallinity) thermoplastics typically soften at about 120 to 150° C. (or even 240° C.) (of glass transition temperature). In contrast, semi-crystalline thermoplastics with degrees of crystallinity higher than 5% have a high 400° C. (approx.) melting temperatures.

As a result of being amorphous, the drapability is enhanced and the thermoplastic film acting as a resin barrier better adapts to the ensemble shapes.

Thermoplastic films used to wrap cores in composite manufacturing are typically stiffer, rendering necessary to produce cuts therein to improve drapability, but consequently their resin-barrier function is lost.

With the present invention, either flat, curved or highly curved panels (e.g., radius up to 400 to 800 mm) can be manufactured without prompting the defects that are typically produced at the edge of the honeycomb core such as bridges, core crushing, depression at the edge of the honeycomb cores or telegraphing.

Apart from the panel shape, the invention is not constrained by the material, density or strength of honeycomb core and it can be applied regardless of panel size, to panels with only one or multiple honeycomb cores, or even panels comprising large composite monolithic areas together with honeycomb cores, or staggered cores. In other words, the present invention is a versatile solution.

The amorphous thermoplastic film is pervious to gases and impervious to resin so that, advantageously, the extraction of air entrapped in the honeycomb cells is therefore promoted without exposing the open honeycomb cores to the resin infusion process.

In the absence of an amorphous thermoplastic film pervious to gases, the invention is still practicable since air may escape laterally from the honeycomb core.

Examples of this amorphous crystalline or minimal semi-crystalline thermoplastic films include films made of: Polyvinyl Fluoride (PVF), Polyetherketoneketone (PEKK), Polyaryletherketone (PAEK), Polyether ether ketone (PEEK), Polyethylenimine (PEI) or Polyphenylene sulfide (PPS). Films made of PEKK, PAEK, or PEEK may be most suitable.

To avoid the infused resin to enter in the honeycomb core cells, both materials, the amorphous thermoplastic film and the adhesive layer, should have the same or similar dimensions and covers completely all the surface of the honeycomb core.

Thus, as mentioned, the honeycomb core is sealed during adhesive layer curing, which occurs mostly or totally before resin infusion. Depending on panel complexity the adhesive layer curing can be performed in the same cycle just before resin infusion (for simple geometries) or in a separate curing cycle.

Therefore, in a particular embodiment, the complete or partial curing of the adhesive layer under vacuum is performed before the step of laying-up the dry fiber over the ensemble.

Especially for non-flat sandwich panels (e.g. radius up to 400-800 mm), or with complex core geometries, performing this pre-curing cycle may accomplish an effective core sealing. In this previous curing cycle, the adhesive film bonds the thermoplastic film to the honeycomb core, providing at the same time, the curved and/or complex shape to the core facilitating afterwards the dry fiber plies positioning.

This pre-curing for the adhesive layer may be performed at 120° C. for a period of two (2) hours.

The method may further include: (i) laying-up a bottom amorphous thermoplastic film and a bottom curable adhesive layer below the honeycomb core to be part of the ensemble; and (ii) laying-up a bottom dry fiber below the ensemble. The ensemble is formed by the honeycomb core, bottom and top curable adhesive layers, and bottom and top amorphous thermoplastic films.

In addition, surrounding such an ensemble, there are bottom and top dry fiber plies.

In an embodiment, these dry fiber plies comprise a binder on their surfaces promoting the plies being bonded to each other and because innermost plies shall contact the amorphous thermoplastic film, the binder may assist in its bonding with the thermoplastic film.

This further improves core adaptation while reduces possible further core defects caused by undesirable movement of the following dry fabric plies.

In this embodiment, the method may further comprise performing a hot membrane forming to the top dry fiber over the ensemble. The hot membrane forming may be performed at a temperature in a range of 80° C. to 105° C. for sufficient period which depends on the technical means used. The period may be in a range of 15 to 30 minutes. The hot membrane forming step allows consolidating the dry fabric plies to the final shape of the panel to reduce further defects due to undesirable movement of the fabrics during curing.

One of the key factors for assuring good mechanical properties to be imparted in the final panel lies with the resin infusion process. Conventionally, the resin is delivered through an inlet channel on a lateral of the panel and, then, is distributed through the dry fiber plies. This process continues up to infusing all these dry fiber plies throughout their thickness, except for the honeycomb core thanks to the barrier layer that prevents resin from entering therein.

During this resin infusion process, attention may be paid to avoid resin bridging or preferred channels for the resin impregnation such as air trapped within the core.

To optimize the mechanical properties of the resulting panel, a specific resin infusion process has been developed. The resin infusion process may include a first resin infusion mesh arranged underneath the bottom dry fiber, and a second resin infusion mesh is arranged on top of the top dry fiber.

As known, a resin infusion mesh is a mesh pattern which promotes resin flow during the infusion process. These resin infusion meshes create preferable paths for the correct distribution of the resin within the dry fiber plies as they provide a more suitable surface tension.

The inventor found that resin impregnation along a plane is limited to a few hundred millimeters which limits the use of such impregnation technique to small size panels having dimensions of only a few hundred millimeters. The resin infusion mesh allows for greater resin impregnation which is helpful for large panels and panels having complex shapes. The resin infusion process is assisted by use of resin infusion meshes. The resin infusion meshes assist to avoid dry areas (without resin) in central areas of a honeycomb core.

A central resin inlet to a mold, e.g., a one-sided mold, assists in distributing the resin throughout the panel. The combination of a central resin inlet and resin infusion meshes aid uniformly distributing resin and in optimizing mechanical properties of the resulting honeycomb sandwich panel.

The one-sided mold may comprise a substantially central inlet for letting matrix material infuse the dry fiber. A substantially center inlet is an inlet at a center of the mold or offset from the center by no more than ten percent (10%) of the largest dimension of the mold. A matrix material infuses said fiber layer through a substantially central inlet of the one-sided mold.

That is, the resin is delivered through a hole placed in the tool, i.e. below the core, approximately at the panel center. The first resin infusion mesh placed beneath the plies, in contact with the tool, promotes resin distributes along all the lower surface quicker than in a standard process. Then, once the resin reaches the honey-comb core edges, it goes up towards the top dry fiber plies thanks to the other resin infusion mesh located on top.

As a result, higher mechanical properties than those achieved conventionally have been obtained. In particular, the Flat Wise Tension ('FWT') test and Drum Peel Test have been conducted. For FWT, values above 6 MPa have been achieved with high density honeycomb cores (e.g. around 96 kg/m3), meaning that failure will occur within the honeycomb first, for any standard honeycomb core in terms of density and strength. The resulting interface joint either between the cured adhesive layer and amorphous thermoplastic film or between the amorphous thermoplastic film and the resin-infused is stronger (at least twice in terms of resistance) than in conventional panels.

In view of these results, sandwich structures can be used in aeronautics for secondary structures regardless of its honeycomb core density. Also, since these results exceed expectations, the present invention may bring the use of sandwich panel structures with high-density honeycomb cores in primary structures in aeronautics thanks to their outshining mechanical behavior.

Further, sandwich panels manufactured according to the present invention are water-tight. Unlike using a dedicated outer impervious film (e.g. PVF film) for ensuring the water-tightness function that is exposed and, consequently, subjected to tearing; the present invention benefits from embedding an amorphous thermoplastic film closer to the honeycomb core and, thus, it is protected by the surrounding composite covers.

Water-tightness tests have determined that no water ingestion is produced when test conditions represent the whole service life of the aeronautical panel. This is a key parameter to ensure that there are no undesired weight increase or degradation due to water present inside the honeycomb cells.

In addition, the present invention may be embodied as an automated process with no or minor human contribution, allowing to eradicate any defect, resin bridge or deformation of the dry fabric plies placed over the honeycomb core.

In this embodiment, the method is automated by: (i) cutting at least the curable adhesive layer, the amorphous thermoplastic film and the dry fiber by a computer numerical control machine; (ii) arranging the honeycomb core, a top curable adhesive layer and a top amorphous thermoplastic film on the one-sided mold by a pick-and-place machine; (iii) arranging dry fiber on top by said pick-and-place machine; and (iv) further arranging a vacuum sheet on top by said pick-and-place machine, forming a gas-tight space with the one-sided mold thereby.

The vacuum sheet forms a gas-tight space with the one-sided mold, as known, by sealing the edges of the vacuum sheet.

In case the honey-comb core is to be sealed at both sides with a composite covers, the method further comprises cutting, by the computer numerical control machine, a bottom curable adhesive layer and a bottom amorphous thermoplastic film and arranging them, by the pick-and-place machine, beneath the honey-comb core.

The degree of automation is highly increased since dry fiber plies can be arranged with the pick-and-place machine. On the contrary, pre-preg should be laid in situ and has additional drawbacks such as their stickiness thus preventing its automation.

So far, it is not known by the inventors a manufacturing process for sandwich panels using either pre-preg or infusion/injection processes that allow fully automatization without jeopardizing the mechanical properties of the final panel.

To expedite the process, the method can further prepare the auxiliary infusion materials commonly used in vacuum systems such as peel plies, perforated release films and any resin infusion mesh. To do so, the computer numerical control machine cut these auxiliary plies and the pick-and-place machine arranges them in the correct order.

In a second inventive aspect, the invention provides a sandwich panel manufactured by any of the embodiments of the method of the first inventive aspect, wherein the sandwich panel comprises a honeycomb core having honeycomb cells and, at least on one side on said honeycomb core, from the inside to the outside: a curable adhesive layer and an amorphous thermoplastic film.

In an embodiment, the honeycomb sandwich panel may be a non-flat aeronautical sandwich panel with a curvature radius up to 800 mm, such as a curvature radius of up to 400 mm.

In a third inventive aspect, the invention provides a manufacturing tool for manufacturing a sandwich panel according to embodiments of the method of the first inventive aspect, wherein this manufacturing tool comprises: (i) a one-sided mold suitable for arranging dry fiber and an ensemble formed by a honeycomb core having honeycomb cells and, at least on one side on said honeycomb core, from the inside to the outside: a curable adhesive layer and an amorphous thermoplastic film, wherein said one-sided mold may comprise a substantially central inlet configured to let the resin infuse the dry fiber; (ii) a vacuum sheet configured to be arranged over said one-sided mold for forming a gas-tight space therein, and (iii) a first resin infusion mesh configured to be arranged underneath the bottom dry fiber, and a second resin infusion mesh configured to be arranged on top of the top dry fiber over the ensemble.

In a particular embodiment, the manufacturing tool further comprises: (iv) a computer numerical control machine configured to cut curable adhesive layer, amorphous thermoplastic film and dry fiber; (v) optionally, the computer numerical control machine may be configured to cut auxiliary infusion plies such as peel ply, perforated release films and any resin infusion mesh; (vi) a pick-and-place machine configured to arrange a bottom curable adhesive layer, a bottom amorphous thermoplastic film, the honeycomb core, a top curable adhesive layer and a top amorphous thermoplastic film on the one-sided mold; (vii) optionally, the pick-and-place machine may also be configured to arrange bottom and top dry fiber and any auxiliary infusion material on the one-sided mold; and (viii) means for arranging a vacuum sheet on top, while forming the gas-tight space therein.

In a particular embodiment, the manufacturing tool further comprises: means for automatically performing a hot membrane forming to the dry fiber plies over the ensemble formed by the honeycomb core having honeycomb cells and, and at least on one side on said honeycomb core, from the inside to the outside: a curable adhesive layer and an amorphous thermoplastic film.

As known, hot membrane forming is a type of 'preforming' step that typically uses a membrane and heat to exert pressure over the preform in order to consolidate it.

Because of the automated nature of these embodiments, high temperature may be kept in the transmissions between steps.

All the features described in this specification (including the original claims, description and drawings) and/or all the steps of the described method can be combined in any combination, with the exception of combinations of such mutually exclusive features and/or steps.

SUMMARY OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION

Figure 1:
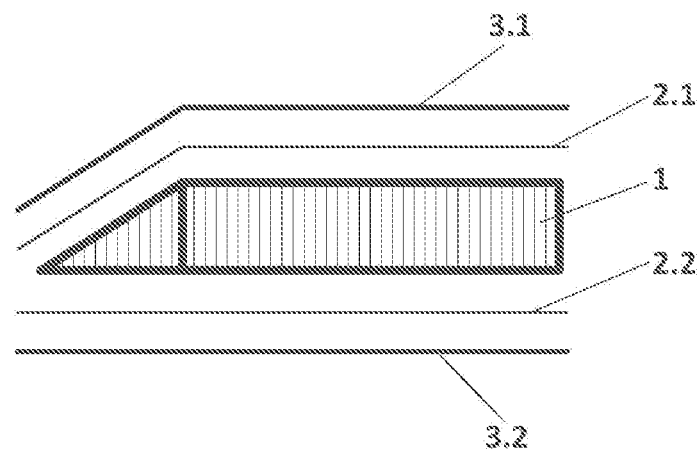
FIG. 1 is a schematic of an ensemble of the honeycomb core covered by amorphous thermoplastic films and curable adhesive layers.

As it will be appreciated by one skilled in the art, aspects of the present description may be embodied as a method, as features of the resulting sandwich panel or as a manufacturing tooling.

The invention may be embodied as a method for manufacturing a sandwich panel with a honeycomb core (1). The method may comprise, in a basic configuration, the following steps: (i) laying-up an ensemble formed by a honeycomb core (1) having honeycomb cells and, at least on one side on said honeycomb core a curable adhesive layer (2.1) and an amorphous thermoplastic film (3.1); (ii) laying-up a dry fiber (4.1) over the ensemble; (iii) arranging the dry fiber (4.1) and ensemble on a one-sided mold (12) and covering the dry fiber and ensemble with a vacuum sheet(s) (8, 9, 10) to form a gas-tight space between the vacuum sheet(s) and the one-sided mold, wherein the gas-tight space contains the ensemble and dry fiber; (i) producing a vacuum in said gas-tight space before complete or partial curing of the adhesive layer (2.1), to fully or at least partially evacuate the honeycomb cells in the honeycomb core before they are sealed by the curable adhesive layer (2.1) and the amorphous thermoplastic film (3.1); (iv) infusing the fiber layer (4.1) under vacuum with a resin; and (v) curing the resin under vacuum during a temperature cycle.

FIG. 1 depicts an ensemble formed by a honeycomb core (1) having honeycomb cells and, the honeycomb core is entirely covered by bottom (2.1) and top (2.2) curable adhesive layers, and bottom (3.1) and top (3.1) amorphous thermoplastic films. The covering by the curable adhesive layers and the amorphous thermoplastic films covers the top and bottom outer surfaces of the honeycomb core and the outer sides of the core that are between the top and bottom surfaces.

The amorphous thermoplastic films (3.1, 3.2) may have zero crystallinity or a minimal semi-crystalline, i.e. having less than 5% of crystallinity degree. The amorphous thermoplastic films may be formed of one or more of: Polyvinyl Fluoride (PVF), Polyetherketoneketone (PEKK), Polyaryletherketone (PAEK), Polyether ether ketone (PEEK), Polyethylenimine (PEI) and Polyphenylene sulfide (PPS).

The amorphous thermoplastic films (3.1, 3.2) may have a surface treatment to improve adhesion with their respective adhesive layers (2.1, 2.2).

The honeycomb core (1) may be a hexagonal-celled polyamide paper with phenolic resin impregnated. The adhesive films (2.1, 2.2) for composite bonding may be structural epoxy with dual curing temperature of for example in a range of 120° C. to 180° C. for curing.

Either compacted or not, during the process of curing the adhesive layer(s), air extraction from honeycomb core cells is done to avoid air being trapped inside the cells. The honeycomb cells may be at least partly evacuated before they are sealed by the curable adhesive layer (2.1, 2.2) and the amorphous thermoplastic film (3.1, 3.2). Accordingly, certain vacuum level is may be applied to the ensemble at room temperature to achieve air extraction and, then, heat is gradually applied while maintaining such vacuum.

This vacuum level may be at a level below a level that might cause the core to collapse. The appropriate vacuum level may depend on the core geometry, chamfer slope of the core and core density. An exemplary vacuum level for a sandwich panel is typically in a range of 200 to 400 mbar.

The process continues by laying-up the dry fibber plies (4.1, 4.2) over the ensemble which may or may not have been compacted.

The dry fiber plies (4.1, 4.2) may be a dry reinforce type such as glass (for Glass Fiber Reinforcement Polymer, 'GRFP'), carbon (for Carbon Fiber Reinforcement Polymer, 'CRFP'), fabric (crimped) or non-crimp fabric (also made of carbon or grass fiber) to be placed on top of the ensemble, i.e. the sealed honeycomb core (1).

Figure 2:
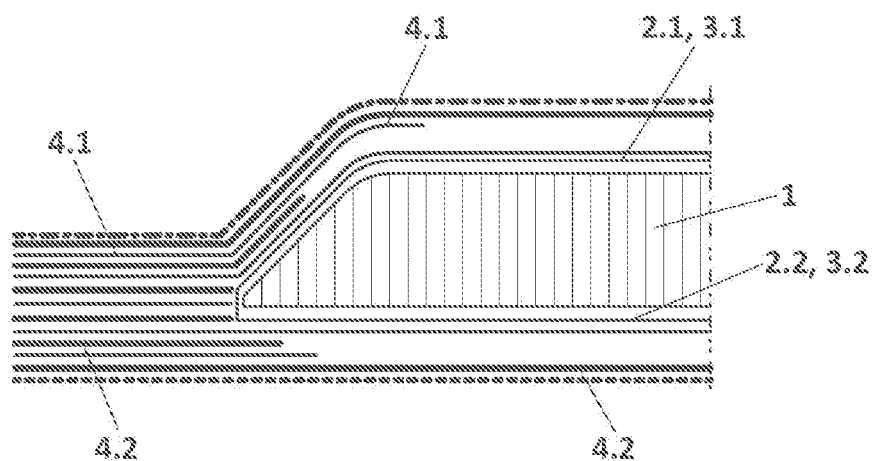
FIG. 2 is a schematic of a honeycomb sandwich panel according to an embodiment of the present invention.

FIG. 2 depicts an example of the resulting arrangement with dry fiber plies (4.1, 4.2) below and above the ensemble. In FIG. 2, it can be seen that bottom (4.2) and top (4.1) dry fiber plies follow the contours of the outer surfaces of the honeycomb core, extend beyond the edges of the honeycomb core (1) and are brought together beyond the edges.

These bottom (4.2) and top (4.1) dry fiber plies includes glass plies and/or carbon plies.

Once the ensemble and dry fiber plies are arranged on a one-sided mold (12) they are covered by the vacuum sheet(s) (8, 9, 10) to form a gas-tight space between the sheet(s) and the mold that includes the ensemble and dry fiber plies. A vacuum is applied to the gas-tight space to evacuate air and assist resin flow through the dry fiber plies. To help resin flow easily and reach all areas of the dry fiber plies (4.1, 4.2), a particular temperature is applied during this step, such as a temperature of 120° C. or in a range of 110° C. to 130° C.

Once the resin has properly infused the dry fiber plies (4.1, 4.2), the resin is cured by increasing the temperature according to a particular curing cycle.

According to the present invention, there are two main embodiments for performing the method.

In a first example, all the plies of the honeycomb sandwich panel are laid-up on the one-sided mold (12) and confined by the vacuum sheet (8, 9, 10) to a gas-tight space. Thus, the ensemble, the dry fiber plies and any auxiliary infusion plies are in the gas-tight space and a vacuum is applied and maintained at a level that may be in a range of 200 to 400 mbar for 15 min or another period of, for example, up to 120 min. Next, temperature is raised to a level in a range of 80° C. to 105° C. and the plies are hot formed together for a period such as 15 min or for up to 30 min. Then, temperature is further raised to an adhesive curing temperature, such as 120° C., to cure the adhesive for a period such as two (2) hours. Finally, resin is infused and the temperature is further raised, such as to 180° C., and maintained to cure the resin according to a curing cycle.

In a second example, the method comprises: (i) laying-up the ensemble formed by the honeycomb core (1), curable adhesive layers (2.1, 2.2) and amorphous thermoplastic films (3.1, 3.2); (ii) applying a vacuum and heat to cure the adhesive layers such as at an adhesive curing temperature of 120° C. to seal the honey-comb core; (iii) the dry fiber plies (4.1, 4.2) are laid-up over the ensemble; (iv) raising the temperature on the dry fiber plies and ensemble to, for example 90° C., for membrane hot forming; and (v) infusing resin into the dry fibers and raising the temperature further to, for example, 180° C., to cure the resin.

As mentioned, in this second example, the plies adapt better to the final geometry preventing dry fiber plies from skidding before the resin infusion.

The vacuum may also be applied for a predetermined time between adhesive curing and resin infusion to mitigate the air expansion during the following curing cycle because of the high temperature. The exact time varies depending on core size, density and vacuum level applied previously.

As mentioned, these examples can be automated as follows: cutting all auxiliary infusion plies such as peel ply (5.1, 5.2), perforated release films (6.1, 6.2) and any resin infusion mesh (7.1, 7.2) in a computer numerical control ('CNC') machine (15); cutting the dry fiber plies (either CFRP, GFRP, fabrics or Non Crimp Fabrics) (4.1, 4.2), the bottom (2.2) and top (2.1) adhesive films, the bottom (3.2) and top (3.1) amorphous thermoplastic films, and optionally, a copper or bronze foils for lightning strike protection in the CNC machine; using a pick-and-place machine (14) to arrange in the one-sided tool (12), the auxiliary infusion plies underneath the ensemble; using the pick-and-place machine to arrange the bottom dry fiber plies (4.2), and the honeycomb core (1) with both adhesive layers (2.1, 2.2) and both amorphous thermoplastic films (3.1, 3.2); performing a hot membrane forming at 90° C. to adapt these plies, so that the adhesive layers (2.1, 2.2) and thermoplastic films (3.1, 3.2) perfectly adapt to the honeycomb core (1) shape; using the pick-and-place machine to arrange the auxiliary infusion plies on top; curing the adhesive layers at the predetermined adhesive curing temperature in order to seal the honey-comb core; and infusing resin and performing the curing cycle, preferably in an oven.

Otherwise, instead of the oven, the curing cycle can be performed in an autoclave without pressure.

A person of ordinary skill in this art will recognize that the step of sealing the honey-comb core (i.e. curing the adhesive layers as defined by such material) and the step of performing the membrane hot forming may be swapped. Therefore, the basic steps should be: a) hot forming, adhesive curing, resin infusion and curing; or b) adhesive curing, hot forming, resin infusion and curing.

Figure 3:
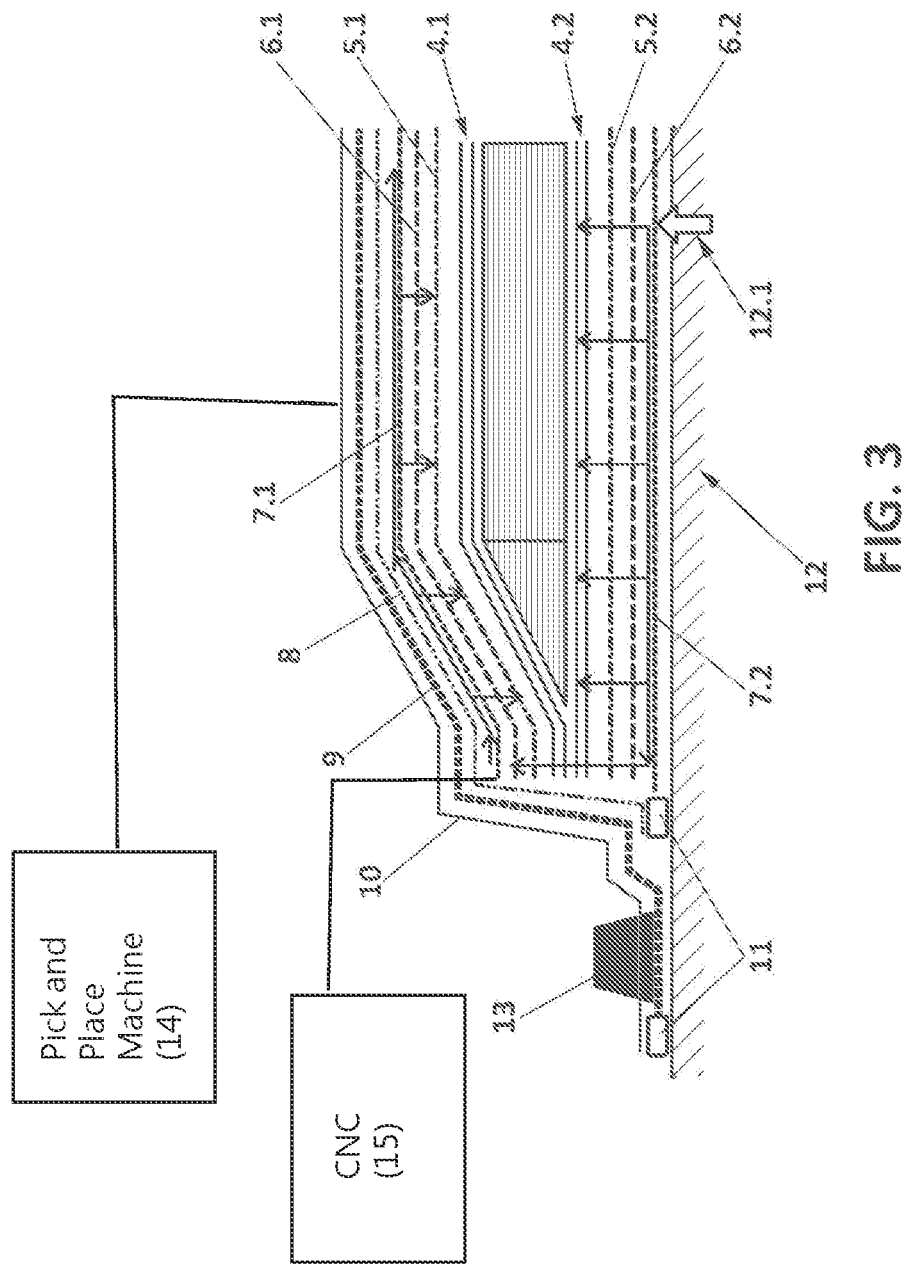
FIG. 3 shows a schematic of an embodiment of a manufacturing tool to form a honeycomb sandwich panel.

FIG. 3 depicts a schematic embodiment of a manufacturing tool with the resulting arrangement of plies according to an embodiment of the present invention where auxiliary infusion plies are also laid-up.

In the middle of the figure, it is seen the honeycomb core (1) with top (2.1) and bottom (2.2) adhesive layers and top (3.1) and bottom (3.2) amorphous thermoplastic films for the function of sealing and stabilizing the core. For illustrative purposes, it is depicted as a single element with the shape of the honeycomb core (1).

Above and below this sealed honeycomb core, it is seen the dry fiber plies (4.1, 4.2) which extend beyond the edge of the honeycomb core and, thus, are brought together.

Also at both sides, there are auxiliary infusion plies such as, from the inside to the outside: peel plies (5.1, 5.2), perforated release films (6.1, 6.2) and a first (bottom) (7.2) and second (top) (7.1) resin infusion meshes.

Regarding the manufacturing tool for manufacturing a sandwich panel according to the previous embodiments, this manufacturing tool at least comprises: a one-sided mold (12) with a substantially central inlet (12.1) configured to let the resin infuse the dry fiber (4.1, 4.2); and a vacuum sheet (8, 9, 10) configured to be arranged over said one-sided mold (12) for forming a gas-tight space therein.

As known, the vacuum sheet typically comprises a semi-permeable membrane (8), an air-weaver (9), and the plastic bag (10).

Also, it has been depicted the sealant tape (11) that let the vacuum sheet (8, 9, 10) form a gas-tight space with the one-sided mold (12). On the left side of FIG. 3, it can be seen the vacuum system (13) to draw the air out of such gas-tight space.

In addition, for exemplary purposes, the expected path of the resin has been drawn by thicker arrows.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a honeycomb sandwich panel comprising:
    laying-up an ensemble including a honeycomb core having honeycomb cells, a curable adhesive layer and an amorphous thermoplastic film, wherein the curable adhesive layer and the amorphous thermoplastic film cover entirely at least an upper or lower outer surface of the honeycomb core;
    laying-up dry fiber on the ensemble;
    arranging the dry fiber and the ensemble on a one-sided mold;
    covering the dry fiber and the ensemble on the one-sided mold with a vacuum sheet layer to form a gas-tight space within which is the dry fiber and the ensemble;
    forming a vacuum in the gas-tight space to at least partially evacuate gas from the honeycomb cells;
    infusing resin into the at least one fiber layer and the ensemble while in the vacuum, and
    curing the resin with heat while the at least one fiber layer and the ensemble are subjected to the vacuum,
    wherein the amorphous thermoplastic film has a degree of crystallinity in a range of zero crystallinity to five percent crystallinity.

2. The method according to claim 1, further comprising at least partially curing the adhesive before the laying-up of the dry fiber on the ensemble.

3. The method according to claim 1, wherein the amorphous thermoplastic film includes top and bottom amorphous thermoplastic films, and the curable adhesive layer includes top and bottom curable adhesive layers, and step of laying-up the ensemble laying-up the top amorphous thermoplastic film and the top curable adhesive layer on an upper outer surface of the honeycomb core, and laying-up the bottom amorphous thermoplastic film and the bottom curable adhesive layer on a lower outer surface of the honeycomb core.

4. The method according to claim 3, further comprising:
    wherein the step of laying-up the dry fiber includes laying-up a bottom dry fiber layer to a bottom outer surface of the ensemble, and laying-up a top dry fiber layer to an upper outer surface of the ensemble, and the method further includes:
    applying a first resin infusion mesh to a bottom surface of the bottom dry fiber layer, and
    applying a second resin infusion mesh to an upper surface of the top dry fiber layer.

5. The method according to claim 3, further comprising:
    cutting at least one of the curable adhesive layer, the amorphous thermoplastic film and the dry fiber with a computer numerical control machine;
    positioning on the honeycomb core, the bottom amorphous thermoplastic film, the bottom curable adhesive layer, the top curable adhesive layer and the top amorphous thermoplastic film using a pick-and-place machine; and
    arranging dry fiber on top, and optionally any auxiliary infusion material, by the pick-and-place machine.

6. The method according to claim 5, further comprising:
    cutting an auxiliary infusion ply by the computer numerical control machine, and
    arranging the auxiliary infusion ply on the one-sided mold by the pick-and-place machine.

7. The method according to claim 1, wherein the step of infusing the resin includes infusing the resin through a substantially central inlet in the one-sided mold.

8. The method according to claim 1, wherein the amorphous thermoplastic film is formed of at least one of: Polyvinyl Fluoride (PVF), Polyetherketoneketone (PEKK), Polyaryletherketone (PAEK), Polyether ether ketone (PEEK), Polyethylenimine (PEI) and Polyphenylene sulfide (PPS).

9. The method according to claim 3, further comprising automatically performing a hot membrane forming step to the top dry fiber layer on the ensemble before curing the adhesive layer.

10. A honeycomb sandwich panel manufactured by the method of claim 1, wherein the honeycomb sandwich panel comprises the honeycomb core having honeycomb cells and the curable adhesive layer and the amorphous thermoplastic film covers an entirety of an upper or lower outer surface of the honeycomb core.

11. A method to form a honeycomb sandwich panel comprising:
    laying-up a bottom curable adhesive layer and a bottom amorphous thermoplastic film to cover entirely an outer bottom surface of a honeycomb core;
    laying-up a top curable adhesive layer and a top amorphous thermoplastic film to cover entirely an outer top surface of a honeycomb core;
    bringing together edges of the top and bottom curable adhesive layers and edges of the top and bottom amorphous thermoplastic films entirely around a perimeter region of the edges to fully enclose the honeycomb core, wherein the laying-up of the top and bottom curable adhesive layers, and the laying-up of the top and bottom amorphous thermoplastic film on the honeycomb core form an ensemble;
    arranging a bottom dry fiber layer on a bottom outer surface of the ensemble;
    arranging a top dry fiber layer on an upper outer surface of the ensemble;
    sealing the top and bottom dry fiber layers and the ensemble in an air-tight space formed between a one-sided mold and a vacuum sheet layer;
    forming a vacuum in the gas-tight space to at least partially evacuate gas from honeycomb cells in the honeycomb core;
    infusing resin into the top and bottom fiber layers while the top and bottom fiber layers and the ensemble are in the gas-tight space and in the vacuum, and
    curing the resin with heat while the top and bottom fiber layers and the ensemble are in the gas-tight space and in the vacuum, wherein the top amorphous top thermoplastic film and the bottom amorphous thermoplastic film have a degree of crystallinity in a range of zero crystallinity to five percent crystallinity.

12. The method of claim 11, further comprising:

applying a first resin infusion mesh to a bottom surface of the bottom dry fiber layer, and applying a second resin infusion mesh to an upper surface of the top dry fiber layer, wherein the first and second resin infusion meshes are applied before the infusion of the resin.

13. The method of claim 11, wherein the step of infusion of the resin includes infusing the resin through an inlet positioned substantially at a center of an outer surface of the one-sided mold.

* * * * *